US009716285B2

(12) United States Patent
Gummalla et al.

(10) Patent No.: US 9,716,285 B2
(45) Date of Patent: Jul. 25, 2017

(54) POROUS NANO-FIBER MATS TO REINFORCE PROTON CONDUCTING MEMBRANES FOR PEM APPLICATIONS

(75) Inventors: Mallika Gummalla, Longmeadow, MA (US); Zhiwei Yang, Vernon, CT (US); Peter Pintauro, Brentwood, TN (US); Kyung Min Lee, Cuyahoga Falls, OH (US); Ryszard Wycisk, Beachwood, OH (US)

(73) Assignee: Audi AG, Ingolstadt (DE)

( * ) Notice: Subject to any disclaimer, the term of this patent is extended or adjusted under 35 U.S.C. 154(b) by 904 days.

(21) Appl. No.: 13/995,580

(22) PCT Filed: Jan. 19, 2011

(86) PCT No.: PCT/US2011/021632
§ 371 (c)(1),
(2), (4) Date: Jun. 19, 2013

(87) PCT Pub. No.: WO2012/099582
PCT Pub. Date: Jul. 26, 2012

(65) Prior Publication Data
US 2013/0280642 A1    Oct. 24, 2013

(51) Int. Cl.
*H01M 8/10* (2016.01)
*D01D 5/00* (2006.01)
(Continued)

(52) U.S. Cl.
CPC ............. *H01M 8/1058* (2013.01); *C08J 5/22* (2013.01); *D01D 5/0007* (2013.01); *D01F 6/12* (2013.01);
(Continued)

(58) Field of Classification Search
None
See application file for complete search history.

(56) References Cited

U.S. PATENT DOCUMENTS 5,635,041 A    6/1997  Bahar et al.
6,403,245 B1   6/2002  Hunt
(Continued)

FOREIGN PATENT DOCUMENTS

JP    2009-245639 A    10/2009
JP    2013-531867 A    8/2013
(Continued)

OTHER PUBLICATIONS

Choi et al., "Electrospun PVDF nanofiber web as polymer electrolyte or separator," *Electrochimica Acta* 50:339-343, 2004.
(Continued)

*Primary Examiner* — Barbara Gilliam
*Assistant Examiner* — Adam A Arciero
(74) *Attorney, Agent, or Firm* — Seed IP Law Group LLP

(57) ABSTRACT

A method of manufacturing a proton conducting fuel cell composite membrane includes the step of electrospinning a non-charged polymeric material, such as PVDF and PSF, into fiber mats. The fibers are fused to one another to provide a welded porous mat. The welded porous mat is filled with proton conducting electrolyte, such as PFSA polymer, to generate a proton conducting composite membrane. The resulting proton conducting fuel cell membrane comprises a randomly oriented, three dimensional interlinked fiber lattice structure filled with proton conducting electrolyte, such as PFSA polymer.

13 Claims, 9 Drawing Sheets

(51) Int. Cl.
- *H01M 8/1058* (2016.01)
- *C08J 5/22* (2006.01)
- *D01F 6/12* (2006.01)
- *D01F 6/76* (2006.01)
- *H01M 8/1018* (2016.01)
- *H01M 8/106* (2016.01)
- *H01M 8/0289* (2016.01)
- *H01M 8/1062* (2016.01)

(52) U.S. Cl.
  CPC ............ *D01F 6/76* (2013.01); *H01M 8/0289* (2013.01); *H01M 8/106* (2013.01); *H01M 8/1018* (2013.01); *H01M 8/1062* (2013.01); *Y02P 70/56* (2015.11)

(56) References Cited

U.S. PATENT DOCUMENTS

| | | |
|---|---|---|
| 6,616,435 B2 | 9/2003 | Lee et al. |
| 6,914,111 B2 | 7/2005 | Mukoyama et al. |
| 6,955,775 B2 | 10/2005 | Chung et al. |
| 7,258,945 B2 | 8/2007 | Bekkedahl et al. |
| 7,318,853 B2 | 1/2008 | Chung et al. |
| 7,396,827 B2 | 7/2008 | Ahlem et al. |
| 7,474,614 B2 | 1/2009 | Elliot et al. |
| 7,482,388 B2 | 1/2009 | Tachibana et al. |
| 7,713,449 B2 | 5/2010 | Adachi et al. |
| 2003/0106294 A1* | 6/2003 | Chung ............... B01D 39/086 55/486 |
| 2005/0058821 A1* | 3/2005 | Smith ............... B01D 67/0009 428/304.4 |
| 2005/0186461 A1 | 8/2005 | Hommura et al. |
| 2008/0176129 A1 | 7/2008 | Lee et al. |
| 2010/0227247 A1* | 9/2010 | Pintauro ............ H01M 8/1023 429/479 |
| 2011/0200907 A1 | 8/2011 | Moon et al. |
| 2013/0101918 A1 | 4/2013 | Yandrasits et al. |

FOREIGN PATENT DOCUMENTS

| | | |
|---|---|---|
| KR | 10-2009-0039180 A | 4/2009 |
| KR | 20090039180 A | 4/2009 |
| KR | 20090130566 A | 12/2009 |
| KR | 101000214 B1 | 12/2010 |
| WO | 2008 084393 A2 | 7/2008 |
| WO | 2009 145570 A2 | 12/2009 |
| WO | 2011/149732 A2 | 12/2011 |

OTHER PUBLICATIONS

Choi et al., "Nafion-impregnated electrospun polyvinylidene fluoride composite membranes for direct methanol fuel cells," *Journal of Power Sources* 180:167-171, 2008.

Choi et al., "Sulfonated Polysulfone/POSS Nanofiber Composite Membranes for PEM Fuel Cells," *Journal of the Electrochemical Society* 157(6):B914-B919, 2010.

Hinatsu et al., "Water Uptake of Perfluorosulfonic Acid Membranes from Liquid Water and Water Vapor," *J. Electrochem. Soc.* *141*(6):1493-1498, 1994.

International Search Report for PCT Application No. PCT/US2011/021632, Oct. 28, 2011.

\* cited by examiner

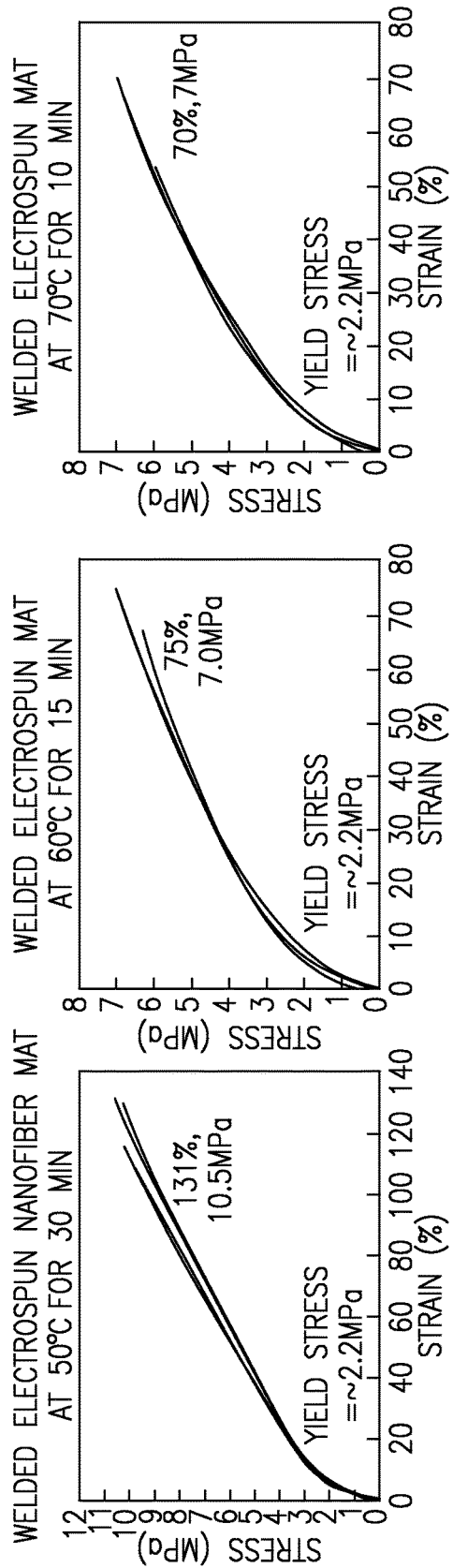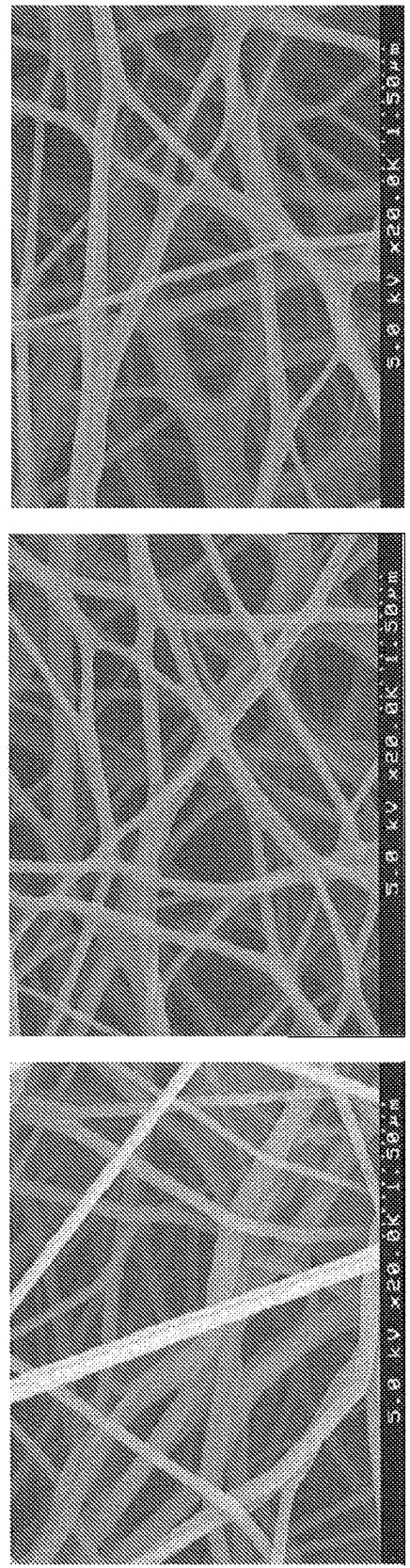
FIG.4A   FIG.4B   FIG.4C

POROUS NANO-FIBER MATS TO REINFORCE PROTON CONDUCTING MEMBRANES FOR PEM APPLICATIONS

BACKGROUND

This disclosure relates to a process used to manufacture porous fiber mats and proton-conducting composite membranes reinforced with the mats.

Proton Exchange Membrane's (PEM's) life is limited by the swelling and contraction of membranes associated with production water uptake and release during fuel cell operation. Membrane reinforcement has been used in an attempt to enhance the mechanical properties and control the water-swelling characteristics, and therefore, enhancing the membrane's lifetime in PEM fuel cells.

High proton conductivity membranes absorb water and swell to a greater degree. Hence the reinforcement mat property requirements vary with the polymer type. The mat fiber diameter, porosity, fiber connection points, and inter-fiber distance are a few of the parameters that determine the mechanical strength and ability to constrain the swelling.

One example solution for membrane reinforcement is using fibrilliform Polytetrafluoroethylene (PTFE), which is prepared by either extruding perfluorinate sulfonic acid (PFSA) resin (in $SO_2F$ form)/PTFE powder mixture with a twin screw extruder into pellets, then hydrolyzing and dispersing the pellets into ethanol-containing solvents, or applying a shearing force to PFSA/PTFE powder dispersion solution to fibrillate PTFE powder into fibrilliform PTFE. The resultant PFSA/fibrilliform PTFE dispersion solution cast into a thin film to create fibrilliform PTFE reinforced ion conducting membrane.

Another example solution for membrane reinforcement includes extruding anhydrous silica containing ethylene/tertrafluoroethylene/C4 terpolymer (ETFE) into a film. The ETFE film was sandwiched between two polyester assist films and subject to simultaneous biaxial orientation to create thin ETFE film. Then, after the assist films were peeled off and anhydrous silica was removed from the thin ETFE film by using hydrogen fluoride, a porous thin ETFE film was obtained, which are filled with a fluoropolymer having a proton conducting group to generate a reinforced proton conducting composite membrane.

Electrospun PVDF nanofiber webs can be used as medical filters, membrane reinforcing materials for genetic separation, and as a support for the electrolyte in batteries. The fiber mat properties, including mechanical and physical, vary with the application. For example, the use of PVDF web (Electrochemica Acta 50 (2004) 339-343) as a polymer electrolyte separator used to support the Li ion electrolyte is not hydration cycled as a hydrogen fuel cell PEM membrane and hence the mechanical strength requirements are not critical.

Nafion impregnated electrospun PVDF composite membranes are discussed by Choi et al., (Journal of Power Sources 180 (2008) 176-171) for direct methanol fuel cell (DMFC) applications. DMFC membranes transport protons while inhibiting methanol crossover. Unlike Hydrogen PEM fuel cell membranes, the DMFC membrane is liquid equilibrated and is not subjected to hydration-based swelling and contraction cycles so Choi et al., did not post process the PVDF fibers to increase the mechanical strength prior to Nafion impregnation. The mechanical properties for the reinforcement, discussed in Choi et al., are driven by ability to process thin membranes to reduce the membrane resistance, but not for durability improvement.

Electrospun polymers for fuel cell applications have also been discussed by Choi et al., (J. Choi, K. M. Lee, R. Wycisk, P. N. Pintauro, and P. T. Mather, J. Electrochem. Soc., 157, B914, 2010). In this art, the authors have electrospun the conducting polymeric material (called charged polymer, like Nafion) and embedded the material in an inert medium (ex. Norland Optical Adhesive) into the Nafion mats (to fill entirely the void space between nanofibers). This is significantly different from the present disclosure where the nonconducting (non-charged) polymer is electrospun and a conducting polymeric material is impregnated into the nonconducting polymer mat.

SUMMARY

While Nafion impregnated electrospun PVDF composite membranes and the like have been used in various applications, no one, to date, has successfully demonstrated such membranes for use in a hydrogen PEM fuel cell. The mechanical strength requirements of the electrolyte membrane for hydrogen PEMFC applications are greater than that for most other applications because of the requirement to minimize the membrane hydration swelling, which if not constained, will lead to membrane failure.

As a result the PEM membrane used in a hydrogen fuel cell requires a reinforcement mat that is both mechanically strong and dimensionally flexible to support the hydration cycling and improve the membrane durability.

A method of manufacturing a proton exchange membrane includes the step of electrospinning a non-charged polymeric material, such as PVDF and PSF, into fibers. The fibers are fused to one another to provide a porous mat. The porous mat is filled with a proton conducting electrolyte, such as perfluoro sulfonic acid (PFSA) polymer, to provide a reinforced proton conducting membrane.

The resulting proton conducting fuel cell membrane comprises a randomly oriented, three dimensional interlinked fiber lattice structure filled with a proton conducting electrolyte, such as PFSA polymer.

BRIEF DESCRIPTION OF THE DRAWINGS

The disclosure can be further understood by reference to the following detailed description when considered in connection with the accompanying drawings wherein:

FIGS. 4A-4C are SEM images and stress-strain curves of welded PVDF
mats at: (FIG. 4A) 50° C. for 30 min, (FIG. 4B) 60° C. for 15 min, (FIG. 4C) 70° C. for 10 min, all with initial fiber diameters of 145 nm.

DETAILED DESCRIPTION

Figure 1:
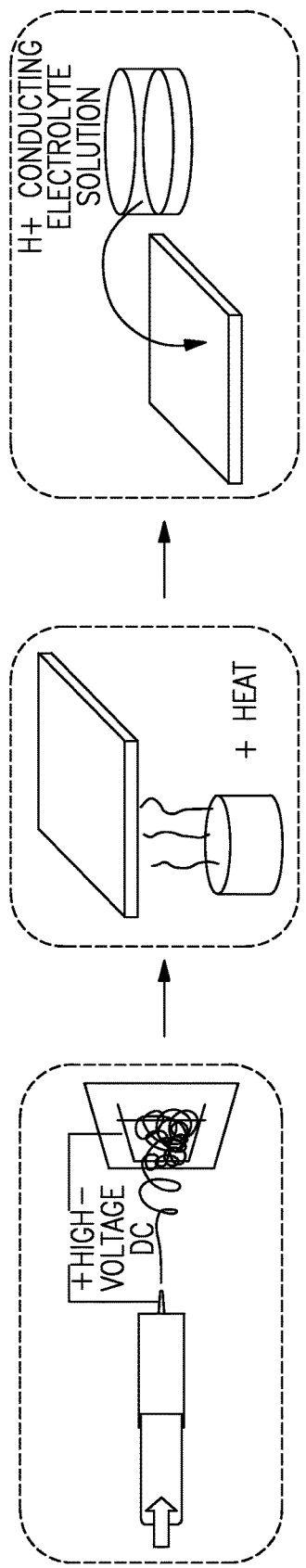
FIG. 1 is a flowchart depicting an example process used to manufacture proton-conducting membranes.

This disclosure proposes a porous polymer mat that could be used to reinforce polymer electrolytes for PEM applications. Referring to the method in FIG. 1, the porous polymer mats are made of fine fibers fabricated by electro-spinning technology, as generally indicated at FIG. 1A, which gives the fibers a high surface to volume ratio and a relatively defect free structure. The fiber mats can be made from various non-charged polymer materials, including but not limited to Polyvinylidene fluoride (PVDF) and Polysulfone (PSU). The fiber diameters are in 1 micrometer scale and can be as fine as 100 nm. The porosities of the fiber mats can be in a range of 95% to 40%. One example porosity range is 80±10%. The fibers in mats are three-dimensionally interconnected, as generally indicated in FIG. 1B, through solvent vapor welding and/or thermal welding process, for example, to provide desirable mechanical properties. The invention relates to reinforced fiber diameters in the range 50 nm to 2000 nms. One example fiber diameter range is 200-500 nm.

The composite membranes are filled with proton conducting electrolytes, such as PFSA polymer, for example, as generally indicated in FIG. 1C. The PFSA-filled PVDF fiber mats, exhibited good interaction between fibers and electrolyte, enhanced mechanical properties, alleviated water-swelling ratio and limited decrease in proton conductivity.

Figure 2A:
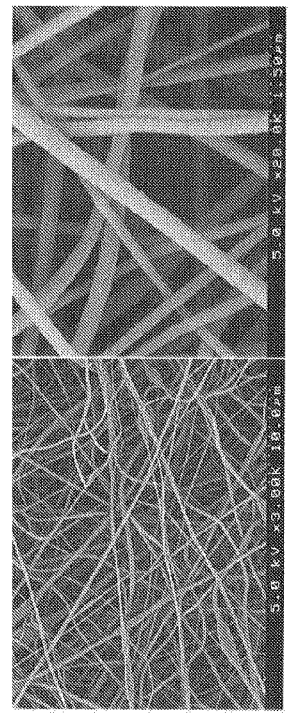
FIGS. 2A-2C are histograms and SEM images of PVDF electrospun mats from three different concentrations.
Figure 2A:
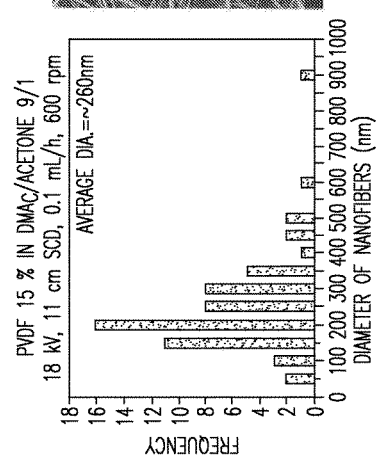
Figure 2B:
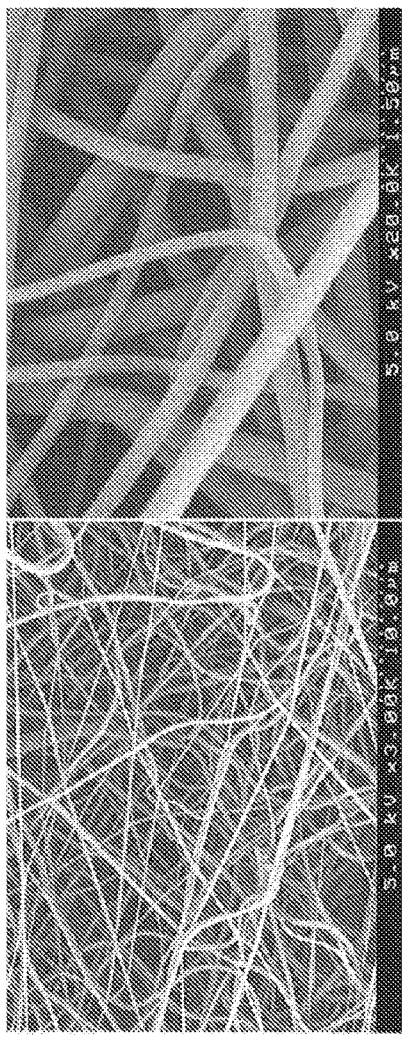
Figure 2B:
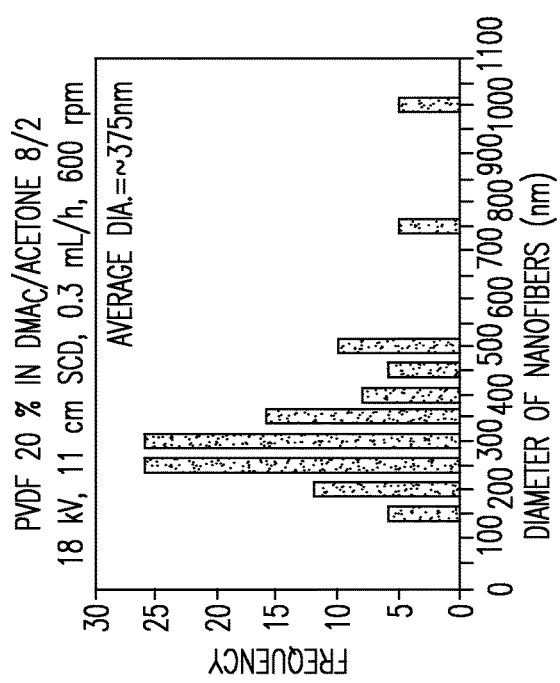
Figure 2C:
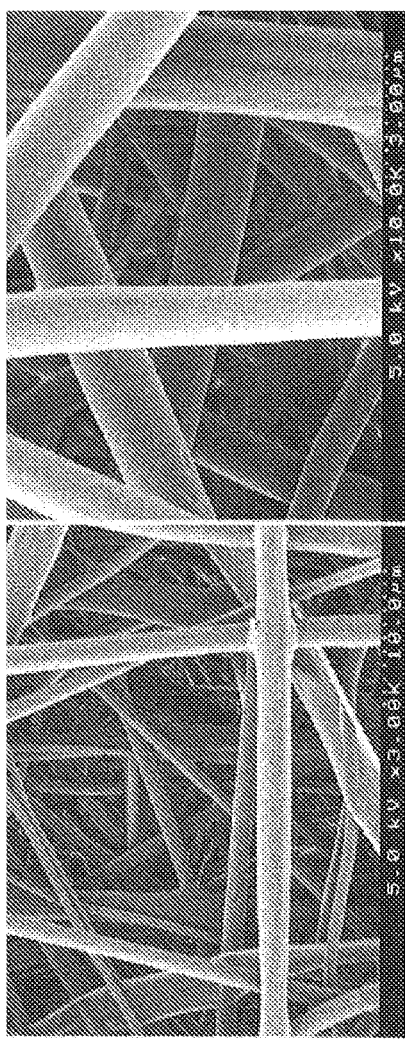
Figure 2C:
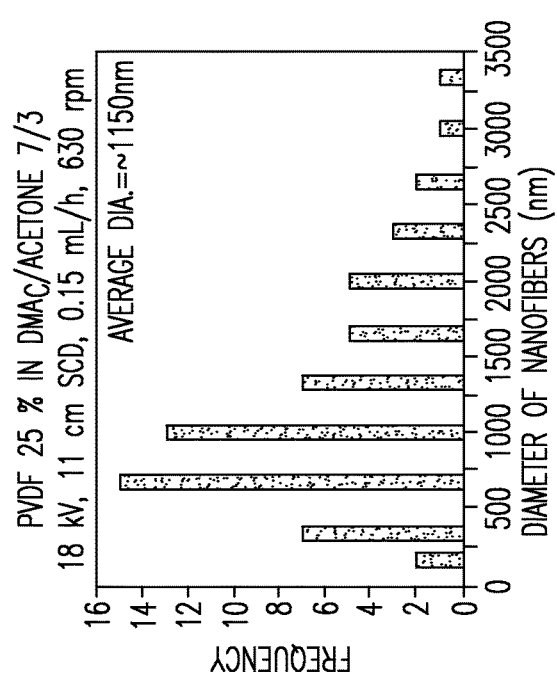

PVDF and PSU nanofiber mats were electrospun using a custom-built rotating drum apparatus. The nominal mat thickness was controlled to be 10-100 μm and the fiber volume fraction was 0.18-0.20. High quality PSU mats and PVDF mats, that contained no beads and no droplets, were obtained by means of controlling the electrospinning conditions (i.e., control of polymer concentration, solvents ratio, voltage, spinneret-to-collector distance and polymer solution flow rate). The electrospinning conditions for making PSU and PVDF mats with an average fiber diameter between 105 nm and 1150 nm were identified. Those conditions are listed in Table 1. It can be seen that all five parameters were modified to control the fiber diameter. Histograms and SEMs of PVDF mats with average fiber diameters of 260, 375 and 1150 nm are shown in FIGS. 2A-2C.

Figure 3A:
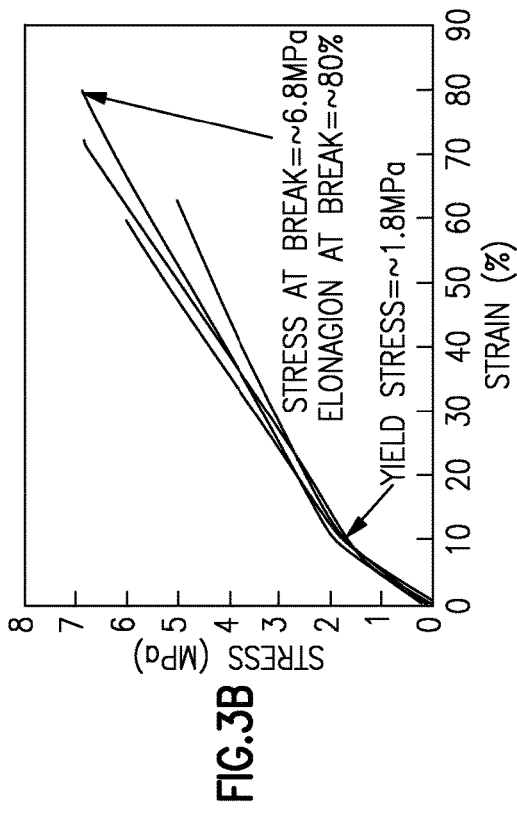
FIGS. 3A-3C are stress-strain curves of the three PVDF electrospun mats shown in FIG. 2 with fiber diameters (left to right) of 260 nm, 375 nm, and 1150 nm.
Figure 3B:
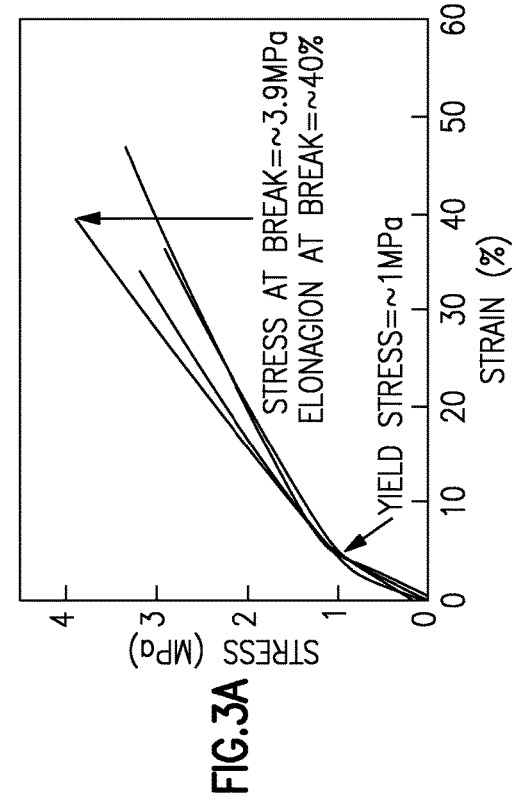
Figure 3C:
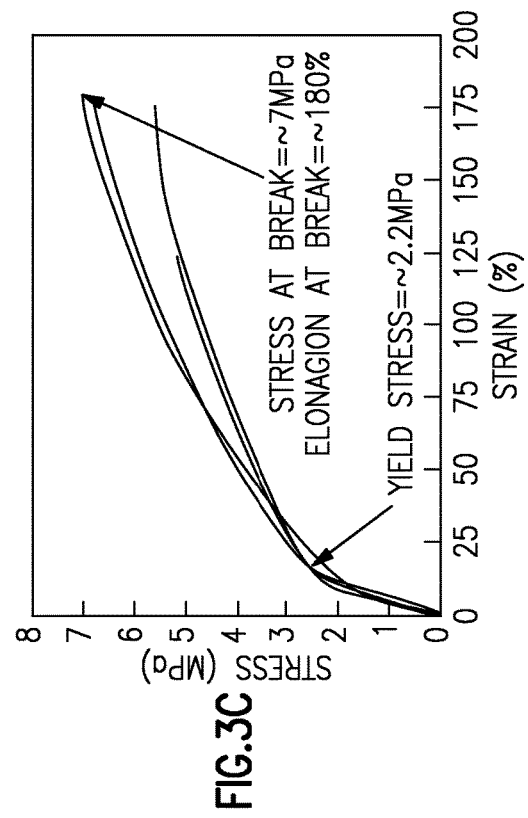

Rectangular samples were cut from PVDF nanofiber mats and tested in a TA Instruments Model 2980 DMA (controlled force mode) at room temperature. The resultant tensile curves recorded for three samples (with an average fiber diameter of 260, 375 and 1150 nm) are shown in FIGS. 3A-3C. It can be seen that all tensile properties improved with increasing fiber diameter. Stress at break increased from 3.9 to 7 MPa and elongation at break increased by more than a factor of four (from 40 to 180%) when the fiber diameter was increased from 260 to 1150 nm. The apparent yield stress also increased significantly (from 1 to 2.2 MPa) when the average fiber diameter was increased from 260 nm to 1150 nm

TABLE 1

Electrospinning conditions and resultant average PVDF nanofiber diameters

| Polymer Conc. (wt %) | DMAc/acetone[1] ratio | Voltage (kV) | Distance[2] (cm) | Flow Rate (mL/hr) | Average Fiber Diameter (nm) |
|---|---|---|---|---|---|
| PVDF = 15% | 0.9/0.1 | 12.5 | 12 | 0.25 | 210 |
| | 0.9/0.1 | 15.0 | 12 | 0.35 | 145 |
| | 0.9/0.1 | 18.0 | 11 | 0.10 | 260 |
| | 0.9/0.1 (with 4% acetic acid) | 12.5 | 12 | 0.25 | 105 |
| | 0.9/0.1 (with 8% acetic acid) | 12.5 | 12 | 0.25 | 103 |
| | 0.8/0.2 | 12.5 | 12 | 0.25 | 230 |
| | 0.5/0.5 | 12.5 | 12 | 0.25 | 340 |
| PVDF = 20% | 0.9/0.1 | 10.0 | 12 | 0.25 | 150 |
| | 0.8/0.2 | 18.0 | 11 | 0.30 | 375 |
| | 0.7/0.3 | 10.0 | 12 | 0.25 | 280 |
| | 0.6/0.4 | 10.0 | 12 | 0.25 | 530 |
| | 0.5/0.5 | 10.0 | 12 | 0.25 | 930 |
| PVDF = 25% | 0.9/0.1 | 10.0 | 12 | 0.25 | 703 |
| | 0.7/0.3 | 18.0 | 11 | 0.15 | 1150 |
| PSU = 20% | 0.9/0.1 | 18.0 | 11 | 0.10 | 350 |
| PSU = 25% | 1/0 | 18 | 11 | 0.10 | 530 |

[1]DMAc = dimethylacetamide
[2]Distance = spinneret-to-collector distance

After electrospinning, the PVDF mats were further processed by forming welds at fiber intersection points. Welding occurred when a mat was exposed to dimethyl formamide (DMF) vapor. Three welding temperatures were investigated (50° C., 60° C., and 70° C.) with mat exposure times ranging from 5 minutes to 30 minutes. The results of the welding tests are summarized in Table 2. DMF exposure times greater than 15 minutes at a temperature greater than 60° C. could lead to mat damage via fiber over-welding.

TABLE 2

Effect of temperature and time of exposure to DMF vapor during welding on the properties of the mats

| Welding temperature (° C.) | Welding time (min) | Mat density (%) | Average fiber diameter (nm) | Yield stress (MPa) | Stress at break (MPa) | Elongation at break (%) |
|---|---|---|---|---|---|---|
| No treatment | — | 18 | 145 | 1.1 | 6.1 | 30 |
| Welding, 50° C. | 20 | 18 | 150 | 2 | 8.2 | 85 |
| | 30 | 19 | 153 | 2.2 | 10.5 | 131 |
| Welding, 60° C. | 10 | 18 | 152 | 2 | 6.2 | 80 |
| | 15 | 19 | 154 | 2.2 | 7 | 75 |
| Welding, 70° C. | 5 | 20 | 160 | 1.5 | 6.3 | 84 |
| | 10 | 23 | 165 | 2.2 | 7 | 70 |

Other solvents may be used to weld the fibers, including but not limited to DMF, such as any one, or mixture, of dimethylacetamide, tetramethyl urea, dimethyl sulfoxide, triethyl phosphate, N-methyl-2-pyrrolidone, trimethyl phosphate, Tetrahydrofuran (THF), Methyl Ethyl Ketone. Of course, solvents different than DMF may require different welding temperature and time. Thus, welding times of 5 minutes-2 hours at a temperature of 23° C.-150° C. may be possible.

Efforts were made to maximize inter-fiber connectivity and increase the apparent yield strength of the mat without a significant change in fiber diameter and mat density. The effects of temperature and exposure time on fiber connectivity and the tensile properties of the welded mat are shown in FIGS. 4A-4C. Solvent welding created stronger mats (yield stress doubled, from 1.1 to 2.2 MPa). The initial average fiber diameter in the mat was 145 nm and the fiber density was 18% (a fiber volume fraction of 0.18). The SEMs in FIGS. 4A-4C show no significant change in fiber volume fraction and a small increase in average fiber diameter occurred after welding (the average fiber diameter increased from 145 to 165 nm).

High temperature annealing of PVDF mats did not significantly improve the mat's tensile properties. In a separate set of experiments, it was found that there was limited improvement in the mechanical properties of the welded mats after mat annealing in the absence of solvents in a temperature range of 160° C.-175° C.

Figure 5A:
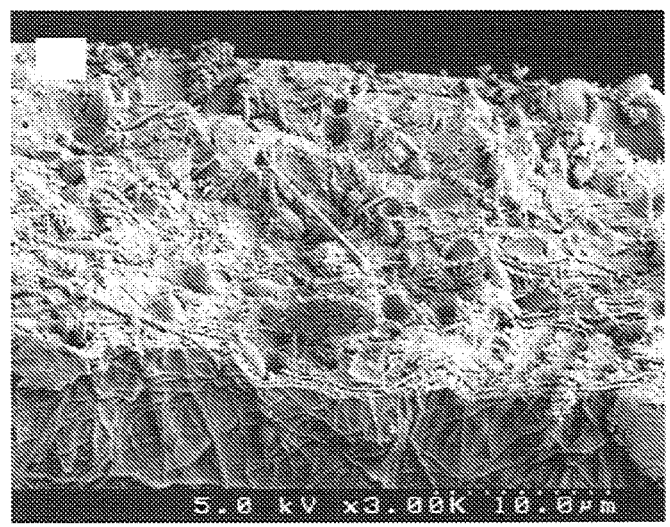
FIG. 5A-5B (5A) a SEM image of Nafion-impregnated PVDF mat, (5B) illustrates stress-strain curves for an initial PVDF nanofiber mat, a welded mat, a recast Nafion membrane (EW1100), and a Nafion-embedded PVDF mat with strain (%) and stress (MPa) at break indicated (all mats are with 105 nm average fiber diameter).
Figure 5B:
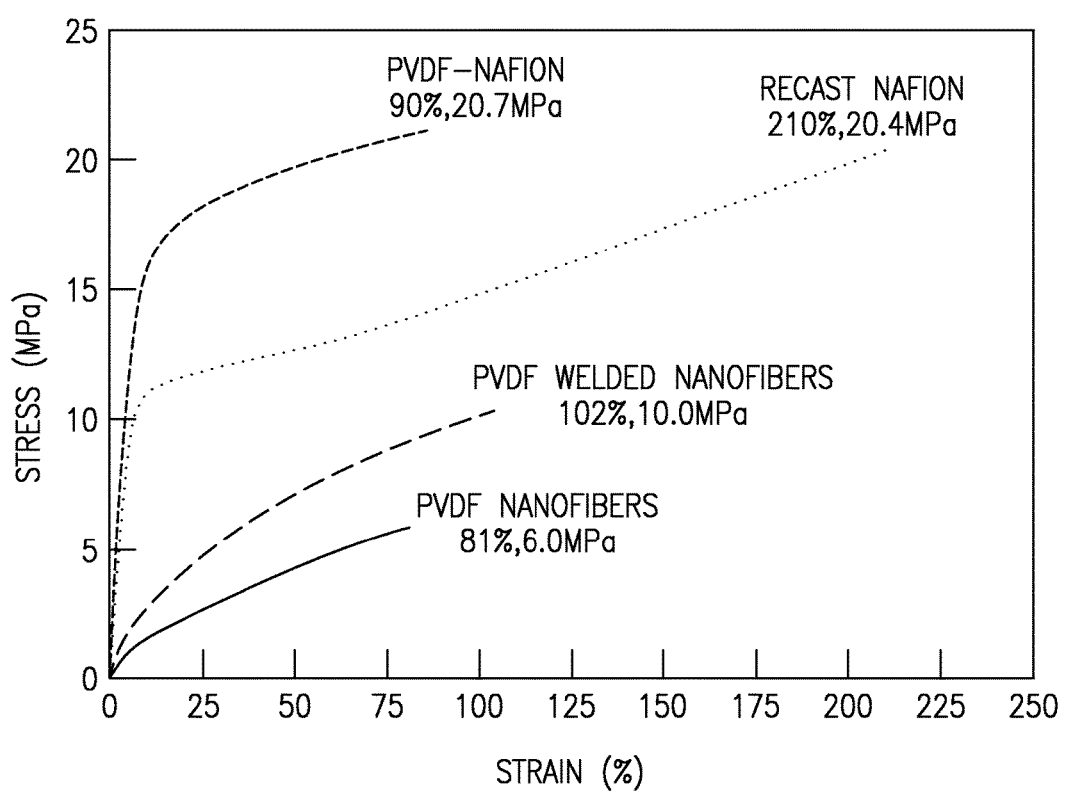

Composite membranes were prepared by impregnation of porous PVDF mats with perfluorosulfonic acid (PFSA) polymer solutions, for example, Nafion. Two impregnations (one for each side of a welded mat) were applied to fully seal all void spaces between nanofibers in the experiments. A commercial 20 wt % Nafion® ionomer solution (1100 EW) was used for impregnation. After solvent evaporation the composite membrane was annealed at 140° C. for 60 minutes. As a representative example, one PFSA impregnated PVDF fiber mat is presented by the SEM image in FIG. 5A. Excellent (i.e., complete) pore filling is evident, with no visible evidence of residual voids. The mechanical properties of PFSA-impregnated PVDF mats were measured. The progression of PVDF mats' tensile properties after electrospinning, after welding, and after PFSA impregnation is presented in FIG. 5B. A significantly higher yield stress was observed for the composite membrane (18 MPa), as compared to a recast Nafion film (11 MPa). Elongation at break was reduced in the impregnated composite membrane (as compared to a homogeneous Nafion film), but it remained high at >90%, making the composite a ductile system.

Composite membranes were pre-treated by soaking in 1 M $H_2SO_4$ at 100° C. for one hour and then boiling in D.I. water for one hour. Proton conductivity (in-plane conductivity measured using an AC impedance method) and gravimetric liquid water uptake were measured at room temperature. The results are presented in Table 3. The conductivity of the composite membranes (with a PVDF fiber volume fraction of 0.18-0.20) was lowered by 17-21% as compared to a reference Nafion sample. This conductivity is consistent with that predicted by a simple mixing rule (i.e., the conductivity of a composite membrane with 18 volume % PVDF fibers is lowered by 18%, as compared to a homogeneous full dense PFSA membrane). Within the fiber diameter range of 100 nm to 1150 nm, the proton conductivity was essentially independent of the average PVDF fiber diameter. Liquid water uptake (the sulfonic acid hydration number), however, decreased with increasing fiber diameter.

TABLE 3

Effect of PVDF fiber diameter on proton conductivity and liquid water swelling of Nafion impregnated membranes (1100 EW Nafion and a PVDF mat fiber volume fraction of 0.20). All measurements at 25° C.

| Fiber diameter (nm) | Conductivity (S/cm) | Water swelling (wt %) | $\lambda$ ($H_2O/SO_3H$) |
|---|---|---|---|
| Recast Nation (EW1100) | 0.095 | 31.6 | 19.3 |
| 105 | 0.079 | 21.0 | 15.7 |
| 280 | 0.077 | 18.3 | 13.7 |
| 530 | 0.075 | 16.8 | 12.6 |
| 1150 | 0.075 | 16.8 | 12.6 |

Figure 6:
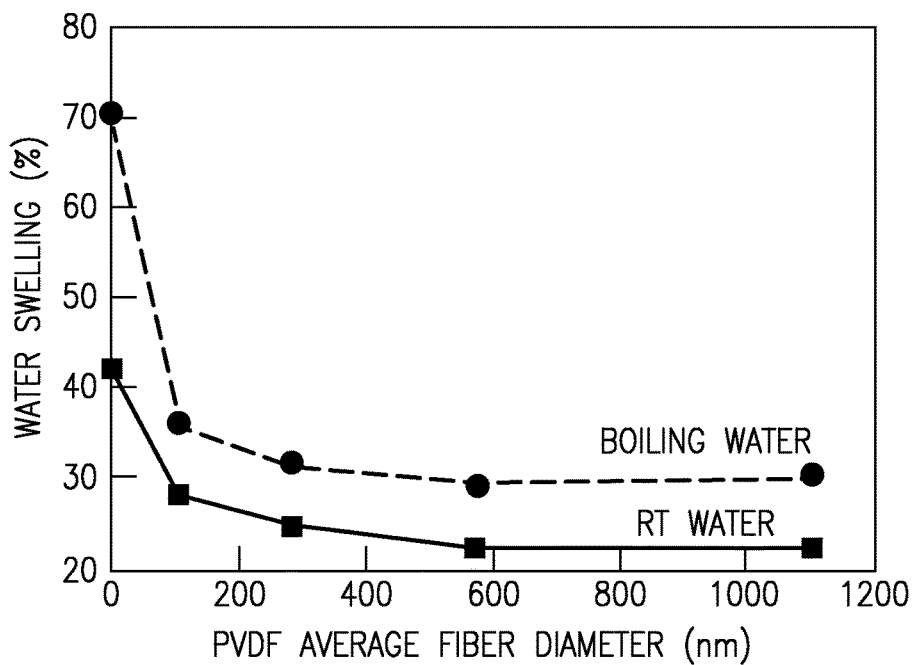
FIG. 6 illustrates the effect of PVDF nanofiber diameter on liquid water swelling of composite membrane measured using room temperature and boiling water.
Figure 7:
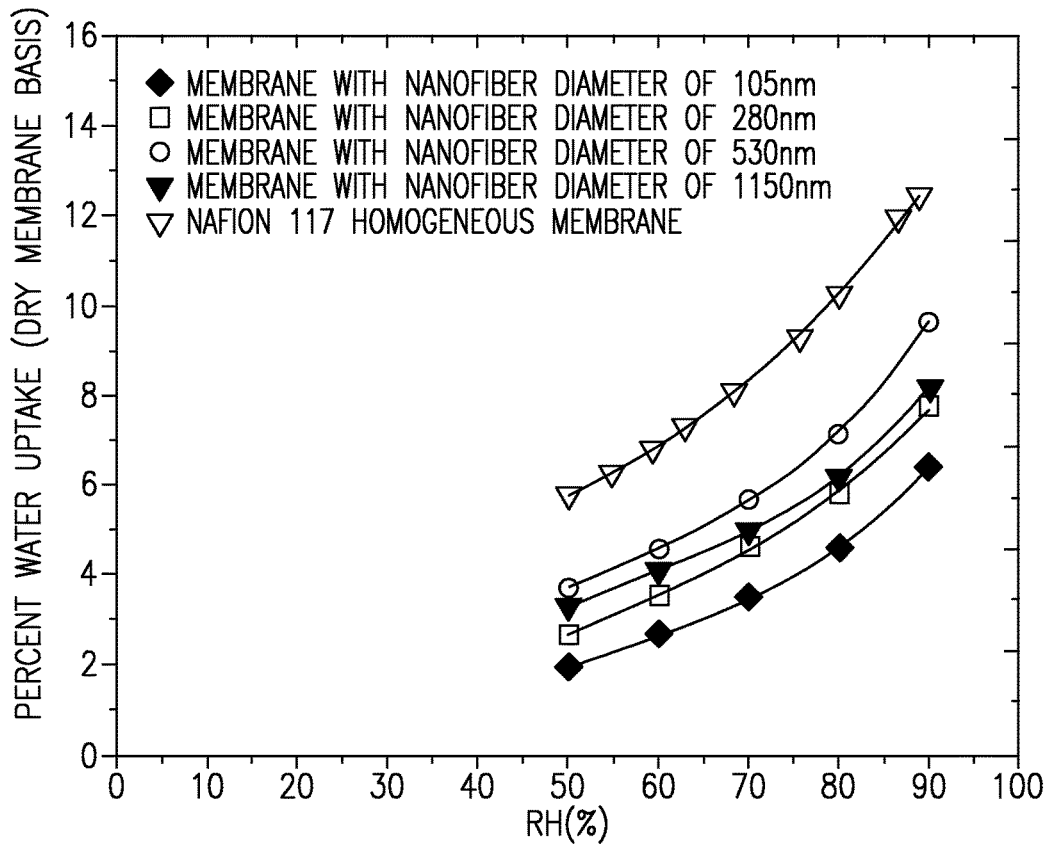
FIG. 7 illustrates equilibrium water vapor uptake in a Neat Nafion membrane and Nafion-impregnated PVDF mats at 80° C.

A more detailed view of the dependence of water swelling on fiber diameter is shown in FIG. 6. A recast homogeneous Nafion membrane is represented as "0 nm" fibers in this plot. In both boiling water and room temperature water, liquid water uptake of composite membranes decreases with increasing fiber diameter up to a PVDF average fiber diameter of ~500 nm. Water vapor uptake was also measured in Nafion-impregnated PVDF films of different PVDF fiber diameters. The results are shown in FIG. 7, as the gravimetric water vapor swelling as a function of relative humidity at 80° C. (the data were collected using a TA Instruments Model Q5000 SA high performance moisture sorption analyzer). For comparison purposes, commercial Nafion water sorption data from the literature are also presented in FIG. 7 (data from J. T. Hinatsu, M. Mizuhata, H. Takenaka, J. Electrochem. Soc. 141, 1493 [1994]). The liquid water sorption results in Table 3 and the vapor sorption results are not consistent (i.e., the ordering of liquid water vs. water vapor uptake results are very different). In Table 3, the composite membranes with 530 and 1150 nm PVDF fibers exhibited the lowest swelling, whereas the water vapor uptake ordering is Nafion>530 nm>1150 nm>280 nm>105 nm (i.e., membranes with the smallest average PVDF fiber diameter had the lowest swelling).

Figure 8A:
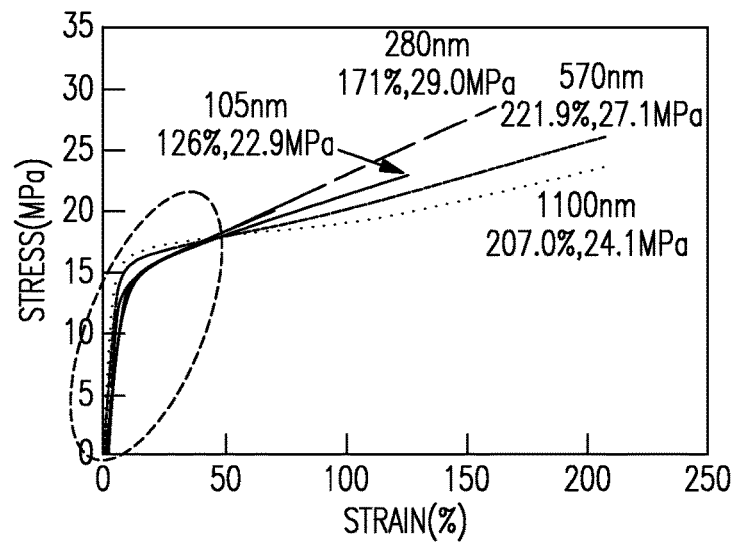
FIG. 8A-8B are stress-strain curves of PVDF nanofiber/Nafion (EW1100) composite membranes illustrating (FIG. 8A) complete curves and (FIG. 8B) is an enlarged view of the circled area in FIG. 8A of the low strain region with extrapolations for the proportional limit stress.
Figure 8B:
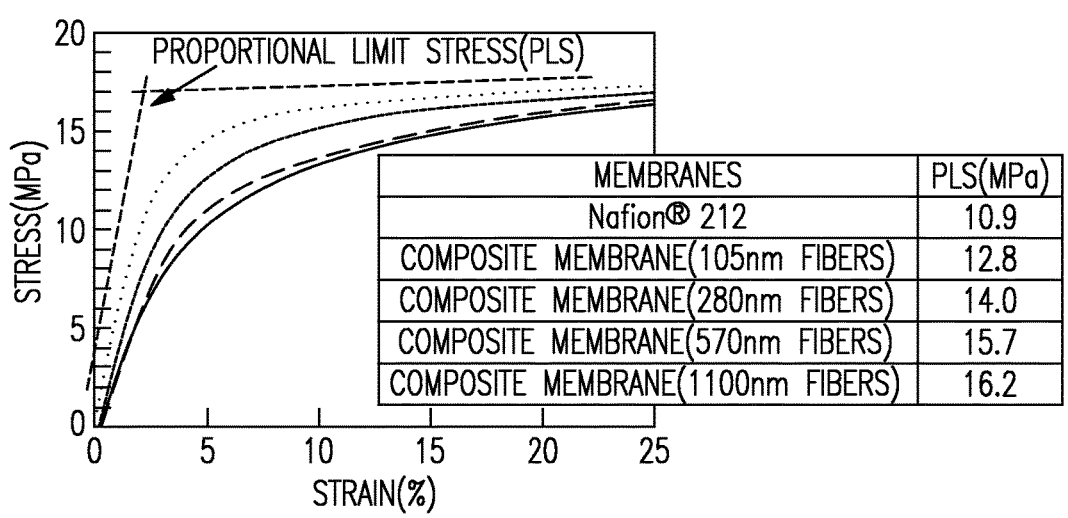

The impact of fiber diameters on the mechanical properties of PFSA-impregnated PVDF composite membranes was measured. Within the tested fiber diameter range (105 nm to 930 nm), FIG. 8A shows that the mechanical properties of composite membranes at break increases with the increase in fiber diameters. The proportional limit stress (PLS) for all composite membranes was greater than that for neat Nafion membrane and also increased with increasing fiber diameter, exceeding 16 MPa at 930 nm fiber diameter. (FIG. 8B).

MEAs were fabricated using a decal method. Catalyst ink contained Nafion dispersion, glycerol, tetrabutyl ammonium hydroxide and carbon supported Pt (40% Pt on carbon powder). The ink was painted onto a Kapton film. After solvent evaporation at 120° C., the dry electrodes were hot-pressed onto a membrane (hot-pressing conditions: 140° C. and 200 psi for 5 min.). Both the anode and cathode electrodes contained 0.4 mg/cm$^2$ Pt and 0.3 mg/cm$^2$ Nafion (1100EW) ionomer.

The resulting MEAs were subjected to an open circuit voltage (OCV) humidity cycling fuel cell experiment with hydrogen/air feeds at 80° C. The hydrogen and air humidifiers in the fuel cell test station were maintained at 80° C. Periodically (every 15 minutes), the cathode air humidifier was bypassed for 15 minutes (in which case dry air was fed to the fuel cell). The OCV was recorded continuously for 25 hours and then the cathode air was replaced with humidified nitrogen and a linear sweep voltammetry experiment was performed to measure hydrogen crossover. A high hydrogen crossover current (>20 mA/cm²) was evidence of membrane failure (e.g., pin-hole or crack formation).

TABLE 4

Reinforcement w/PVDF mats enhanced the composite membranes' lifetime in operating fuel cells

| Membrane | In-cell lifetime |
|---|---|
| Nafion ® - 212 | 200 hrs |
| A composite membrane w/105 nm PVDF fiber mat | 250 hrs |
| A composite membrane w/530 nm PVDF fiber mat | 575 hrs |

The results of the OCV tests are shown in Table 4. A Nafion 212 MEA survived repeated humidity cycling for ~200 hours before a dramatic increase in hydrogen crossover current was measured. The PVDF/Nafion composite membrane with small fibers (105 nm average diameter) operated 25% longer (250 hours) than Nafion 212 (200 hours). The PVDF/Nafion composite membrane with larger fibers (530 nm average diameter) exhibited much better durability and survived the OCV cycling test for 575 hours (more than a 100% improvement in durability, as compared to Nafion 212).

Methodologies for electrospinning PSU and PVDF nanofiber mats with an average fiber diameter of 105-1150 nm have been identified, where the fiber volume fraction in the mat was 0.18-0.20 and the mat thickness was in the range of 10-100 μm. Methods for welding intersecting fibers in a PVDF mat were determined. As expected, an improvement in the mechanical properties of the mat was observed after welding. A procedure for impregnating a PVDF nanofiber mat with proton conducting electrolyte solution was developed. Complete filling of the void space between nanofibers was achieved by two or more impregnations (at least one on each side of a PVDF mat). The mechanical properties (proportional limit stress) of all composite membranes (Nafion impregnated PVDF mats, with an average fiber diameter of 105-930 nm) were superior to those of commercial neat Nafion membranes. Fuel cell MEAs with a composite membrane (Nafion impregnated PVDF mat, where the average PVDF fiber diameters was 530 nm) exhibited superior durability in an OCV humidity cycling test, as compared to Nafion 212 (see Table 4).

The designed polymer fiber mats are expected to have a high surface to volume ratio and a relatively defect free structure, which are suitable for reinforcement purposes. The properties and quality of the fiber mats, in terms of fiber size and porosity, are tunable and can be precisely controlled by electron-spinning technology. A wide range of polymer materials can be electrospun into desired fiber mats at low cost. The fibers are 3-D interconnected to provide mats the best mechanical properties. Proton conducting electrolyte (e.g. Nafion® ionomer) is fully filled in the inter-fiber voids to form uniform composite membranes. The higher uniformity of the composite membranes could exhibit a better control in water-swelling through the membrane plane, giving a lower mechanical decay rate in fuel cells.

Although an example embodiment has been disclosed, a worker of ordinary skill in this art would recognize that certain modifications would come within the scope of the claims. For that reason, the following claims should be studied to determine their true scope and content.

What is claimed is:

1. A method of manufacturing a proton conductive fuel cell membrane comprising:
   electrospinning a non-charged polymeric material into a fiber mat;
   fusing fibers to one another to provide a welded porous mat, the fusing including interlinking the fibers to one another at fiber intersections using solvent vapor welding for between five minutes to thirty minutes and at temperatures between 50° C. to 70° C.; and
   filling the welded porous mat with a proton conducting polymer solution, to provide a proton conducting composite membrane for use in electrochemical cells.

2. The method according to claim 1, wherein the electrospinning includes producing the fiber mat which has an average fiber diameter in a range of 100-1150 nm, a mat thickness in a range of 10-100 μm, and a mat porosity in a range of 40-95%.

3. The method according to claim 2, wherein the average fiber diameter is 100-600 nm.

4. The method according to claim 2, wherein the polymeric material includes at least one of PVDF and PSF.

5. The method according to claim 2, wherein the electrospinning includes dissolving the polymeric material in mixture solvents including DMAc.

6. The method according to claim 5, wherein the electrospinning includes selecting polymeric material concentration, solvent ratio, voltage, spinneret-to-collector distance and polymeric material solution flow to produce fibers in the range without beads or droplets.

7. The method according to claim 6, wherein a polymeric material concentration is 12-25%, a solvent ratio is 50-100% solvent in a mixture including acetone, a voltage of 5-15 kV, a spinneret-to-collector distance of 7-15 cm and a polymeric material solution flow rate of 0.1-0.3 mL/hour.

8. The method according to claim 1, further comprising randomly orienting the fibers in three dimensions.

9. The method according to claim 1, wherein the welded porous mat includes porosity in a range of 40-95%.

10. The method according to claim 1, wherein the fibers are solvent vapor welded at approximately 60° C. for approximately 15 minutes in DMF vapor.

11. The method according to claim 1, wherein a solvent is any one, or mixture, of dimethylacetamide, tetramethyl urea, dimethyl sulfoxide, triethyl phosphate, N-methyl-2-pyrrolidone, trimethyl phosphate, Tetrahydrofuran (THF), Methyl Ethyl Ketone.

12. The method according to claim 1, wherein the welded porous mat includes opposing sides, and the filling includes exposing one of the sides to a solution containing a fluoropolymer having a proton conducting group, and then exposing the other side to the solution.

13. The method of claim 1 wherein the fusing includes interlinking the fibers to one another at fiber intersections using solvent vapor welding for less than fifteen minutes and at a temperature below 60° C.

* * * * *